E. A. HALBLEIB.
ELECTRIC MOTOR OR GENERATOR.
APPLICATION FILED DEC. 16, 1910.
1,041,782.
Patented Oct. 22, 1912.
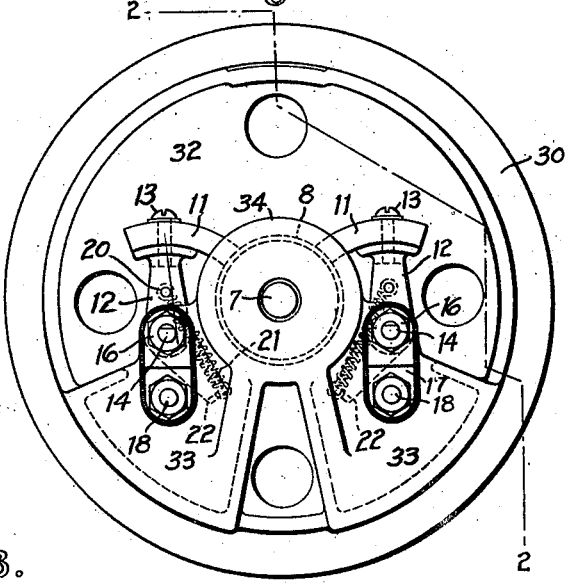
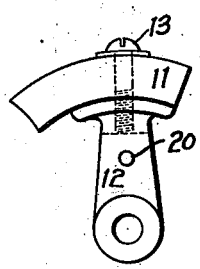
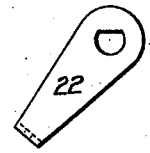
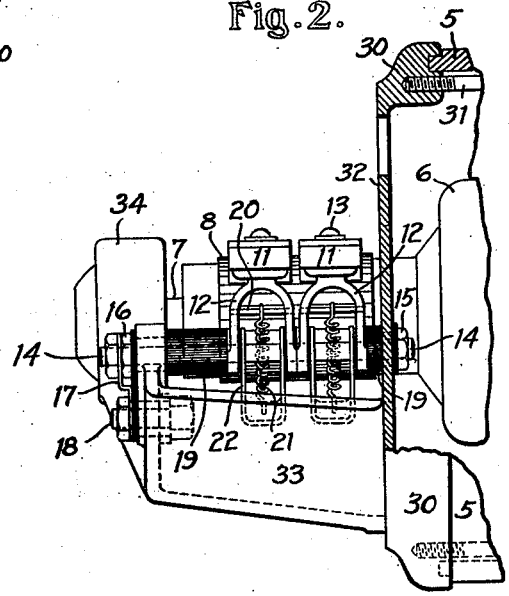
Witnesses:
Clarence W. Carroll
L. Thon
Inventor:
Edward A. Halbleib
Attorneys:
Osgood, Davis & Dorsey
by Farnum F. Dorsey

UNITED STATES PATENT OFFICE.

EDWARD A. HALBLEIB, OF ROCHESTER, NEW YORK, ASSIGNOR TO NORTHEAST ELECTRIC COMPANY, OF ROCHESTER, NEW YORK, A CORPORATION.

ELECTRIC MOTOR OR GENERATOR.

1,041,782. Specification of Letters Patent. Patented Oct. 22, 1912.

Application filed December 16, 1910. Serial No. 597,731.

*To all whom it may concern:*

Be it known that I, EDWARD A. HALBLEIB, a citizen of the United States, and resident of Rochester, in the county of Monroe and State of New York, have invented certain new and useful Improvements in Electric Motors or Generators, of which the following is a specification.

This application relates to electric motors and generators of the type in which collecting-brushes are employed in connection with a commutator.

The object of the invention is to produce a machine of the kind in question, in which the brushes, the brush-holders and the commutator are readily and conveniently accessible for cleaning or repairs, and for this purpose I employ an arrangement of these parts, and of certain portions of the frame of the machine, which will be hereinafter described and claimed.

In the drawings:—Figure 1 is an end-elevation of a motor or generator embodying the present invention; Fig. 2 is a side-elevation of the end of the generator shown in Fig. 1, taken partly in section on the line 2—2 in the latter figure; Fig. 3 is a detail view, on a somewhat larger scale, of one of the brush-holders with a brush secured thereon; and Fig. 4 is a detail view of one of the spring-supporting arms.

The invention is illustrated as embodied in an electric motor or generator of the inclosed type, having a field-ring 5 and an armature 6 of any ordinary or suitable form. The armature is mounted upon an armature-shaft 7, which is provided at one end with a commutator 8 of ordinary form.

The brushes 11 are illustrated as carbon brushes, mounted upon the upper ends of the brush-holders 12 and secured in place by means of screws 13. The brush-holders, as shown particularly in Fig. 2, are in the form of forked arms, of which the lower ends of the bifurcations are pivoted upon horizontal rods 14. These rods are secured in the frame of the machine by means of nuts 15 and 16 at their ends, but the rods are insulated from the frame, as shown. Each rod is flattened on one side, as shown in Fig. 1, so that the rods do not turn in the frame, but the brush-holders fit loosely upon the rods to provide for the necessary pivotal movement. The brush-holders are shown as arranged in pairs, and bushings 19 of insulating material are mounted on the rods 14 to maintain the brush-holders in place and insulate them from the frame.

In order to maintain the brushes in engagement with the commutator, each brush-holder is provided with a pin 20 to which is connected the upper end of a tension-spring 21. The lower end of each spring is connected with a U-shaped spring-supporting arm 22. This arm is mounted upon the rod 14 between the bifurcations of the brush-holder, and is prevented from turning on the rod by the form of the hole through which the rod passes, which is particularly illustrated in Fig. 4. The spring tends to rock the brush-holder toward the commutator, and thus maintains the brush in operative position.

The rods 14 on which the brush-holders are pivoted are mounted in a portion of the frame which comprises a ring 30 fixed to the edge of the field-ring 5 by means of the ordinary screws 31. Integral with the frame-ring 30 is a cover-plate 32, which closes the end of the motor-casing except for ventilating openings. Projecting from the lower part of the ring 30 and the plate 32 are two arms 33, which are integral, at their outer ends, with a support 34 for the shaft-bearing. The brushes may be adjusted about the commutator by loosening the screws 31 and turning the frame-members just described, as a whole, upon the field-ring in either direction. The electrical connections with the brushes are made through binding-posts 18 mounted upon the frame, but insulated therefrom, and connected with the rods 14 by means of conducting-strips 17.

The general arrangement of the brushes and brush-holders and the frame member is one in which convenient access is afforded to the brushes and the brush-holders and the commutator, for the purpose of cleaning or repairing these parts. Owing to the opposite arrangement of the brushes and brush-holders access may be had to both brushes at once from the same direction, *i. e.*, in the illustrated machine, from above. In the usual arrangement of brushes, in which each brush and brush-holder occupies a similar position with relation to the commutator, it is necessary to have access to one brush from above, and the other brush from below.

This feature is one of great value where the invention is employed in connection with a generator used on an automobile, or under other circumstances where the space is confined and access to the machine is difficult. The arrangement of the frame-arms 33 also conduces to convenience in the care of the commutator and brushes. By arranging both these arms below the armature-shaft, all fixed obstructions are removed from the neighborhood of the brushes and the brush-holders, while, at the same time, by spacing the arms apart at the bottom, it is rendered possible to clean the brushes and the commutator in the ordinary manner, that is, by laying a piece of emery cloth over the commutator, drawing the ends downward between the arms, and then working the emery cloth back and forth while engaged by the ends of the brushes.

I claim:—

The combination of the armature-shaft 7, the commutator 8 thereon, the shaft-bearing 34, the frame-ring 30, the arms 33 connecting the shaft-bearing and the frame-ring and located below the armature-shaft and spaced apart to afford access to the commutator from below, the brush-holders 12 pivoted above the arms and projecting upwardly, and the brushes 11 fixed on the brush-holders and engaging the commutator.

EDWARD A. HALBLEIB.

Witnesses:
 FARNUM F. DORSEY,
 D. GURNEE.